United States Patent [19]

Sasaki et al.

[11] Patent Number: 4,868,550
[45] Date of Patent: Sep. 19, 1989

[54] PHOTOELECTRIC TOUCH PANEL

[75] Inventors: Hiroaki Sasaki; Junichi Ouchi; Kazuo Hasegawa, all of Furukawa, Japan

[73] Assignee: Alps Electric Co., Ltd, Japan

[21] Appl. No.: 140,886

[22] Filed: Dec. 30, 1987

Related U.S. Application Data

[63] Continuation-in-part of Ser. No. 838,776, Mar. 12, 1986, abandoned.

[30] Foreign Application Priority Data

Mar. 12, 1985 [JP] Japan .................................. 60-36001

[51] Int. Cl.⁴ ................................................. G09G 3/00
[52] U.S. Cl. ...................................... 340/712; 341/31; 250/221
[58] Field of Search .................... 340/365 P, 706, 709, 340/712; 178/18; 341/31; 250/18

[56] References Cited

U.S. PATENT DOCUMENTS

| | | | |
|---|---|---|---|
| 3,234,512 | 2/1966 | Burkhart | 340/365 P |
| 3,478,220 | 11/1969 | Milroy | 340/365 P |
| 3,764,813 | 10/1973 | Clement et al. | 340/365 P |
| 3,860,754 | 1/1975 | Johnson et al. | 340/365 P |
| 4,459,476 | 7/1984 | Weissmueller et al. | 340/712 |

FOREIGN PATENT DOCUMENTS 2082427  3/1982  United Kingdom ................. 340/707

Primary Examiner—Gerald L. Brigance
Assistant Examiner—M. Fatahiyar
Attorney, Agent, or Firm—Guy W. Shoup; Paul J. Winters; Brian D. Ogonowsky

[57] ABSTRACT

A photoelectric touch panel comprising arrays of equally spaced light emitting elements and photosensitive elements disposed in a frame configuration on the circumference of a CRT display screen in which a matrix of infrared beams is formed in front of the screen. The photoelectric touch panel has a light shielding plate formed into a comblike shape disposed such that each comb tooth thereof is interposed between said photosensitive elements.

1 Claim, 2 Drawing Sheets

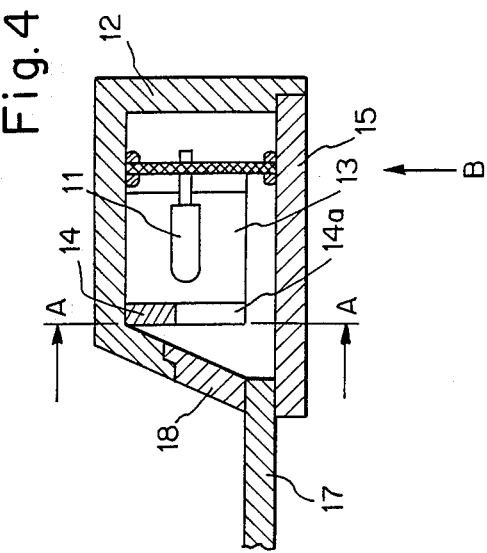
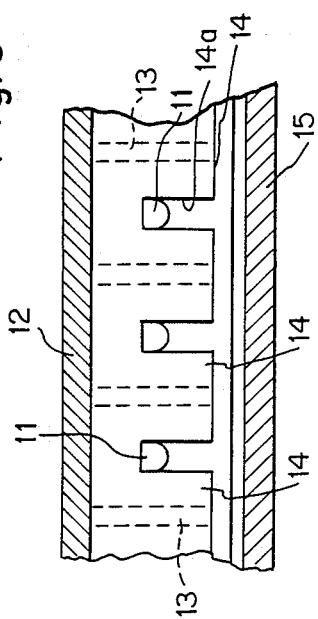
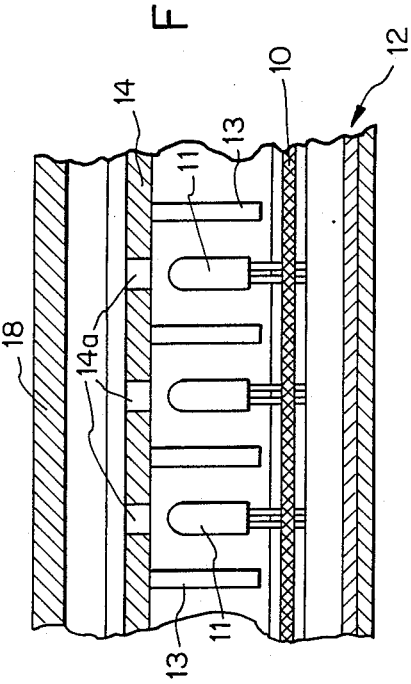

4,868,550

PHOTOELECTRIC TOUCH PANEL

This is a continuation application from application Ser. No. 838,776 filed Mar. 12, 1986, now abandoned.

BACKGROUND OF THE INVENTION

1. Field of the Invention

The present invention relates to a photoelectric touch panel and more particularly to a photoelectric touch panel comprising arrays of light emitting elements and photosensitive elements arranged in a frame configuration on the circumference of a CRT display screen in which a matrix of infrared beams is formed and it is adapted such that, when an object is put in the matrix of infrared beams, the shielded beams thereby cause the coordinates of the shielded position to be input to a computer.

2. Description of the Prior Art

As a photoelectric touch panel of the described type such one as shown in FIG. 3 is known. Referring to FIGS. 3, 1a, 1b, 1c, and 1d are arrays disposed in a frame configuration in front of a screen of a CRT display, in which the arrays 1a and 1b, which are not facing each other, are that of light emitting elements. Namely, LEDs 2, 2, . . . are arranged there at regular intervals. On the other hand, the arrays 1c and 1d, which face the arrays 1a and 1b, are of photosensitive elements. That is, phototransistors 3, 3, . . . are arranged there at regular intervals corresponding to the LEDs 2, 2, . . . . Infrared beams 4, 4, . . . from the LEDs 2, 2, . . . are arranged in a matrix in front of the screen. If any position on the screen is touched by such an object as a finger or a touch pen, specific infrared beams 4, 4 are shielded thereby and causes the X and Y coordinates of the shielded position to be input to a computer.

In such a photoelectric touch panel, as shown in FIG. 2, the phototransistors 3, 3, . . . are put in cylindrical enclosures 5, 5, . . . with their ends sunk to a certain depth from the opening of the enclosure to prevent scattered light from outside, sun beams including infrared rays to a considerable degree in particular, from entering into the phototransistors 3, and the openings of the enclosures 5, 5, . . . are provided with filters 6 which transmit only infrared beams therethrough.

In the arrangement of such enclosures for the phototransistors 3, 3, . . . , however, there was a problem that it was very difficult to construct the enclosure portions 5, 5, . . . in a manner to fit the array of a large number of phototransistors 3, 3, . . . and therefore it was unable to make the constructing work efficiently.

SUMMARY OF THE INVENTION

A primary object of the invention is to solve the above mentioned problem encountered in the prior art and provide a photoelectric touch panel with a light shielding arrangement which can be constructed efficiently.

To attain this object, the invention has contemplated to form a comblike light shielding plate and dispose this shielding plate so that each its tooth is interposed between the photosensitive elements set in alignment.

BRIEF DESCRIPTION OF THE DRAWINGS

FIG. 4 is a front sectional view of the light shielding structure of the invention;

FIG. 5 is a side view of the structure of FIG. 4 taken along section A—A; and

FIG. 6 is a bottom view of the structure of FIG. 4 from the direction B.

DESCRIPTION OF THE PREFERRED EMBODIMENT

A preferred embodiment of the invention will be described below with reference to the accompanying drawings.

Figure 1:
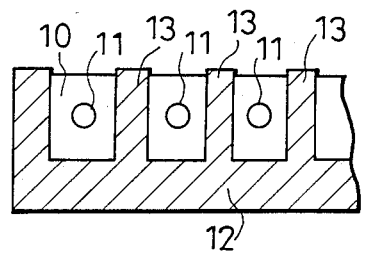
FIG. 1 is a cross-sectional view of principal portion of a preferred embodiment of the invention.
Figure 2:
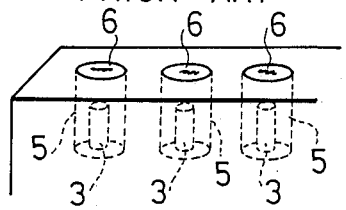
FIG. 2 is a perspective view showing a light shielding arrangement in the prior art.
Figure 3:
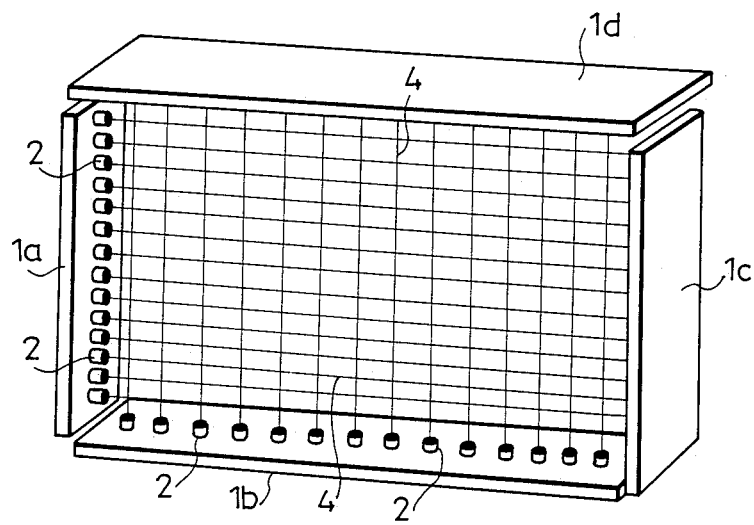
FIG. 3 is a perspective view showing disposition of arrays in the prior art.

Referring to FIG. 1, 10 indicates an array mounting member, in which phototransistors 11, 11, . . . as the photosensitive elements are disposed at regular intervals parallel to each other and oriented facing a direction perpendicular to the plane of the drawing.

And, a light shielding plate 13, 13, . . . formed into a comblike shape integrally with a case 12 is arranged on the array mounting member 10 so that its teeth, in the form of parallel, spaced-apart walls, are each respectively interposed between the phototransistors 11, 11, . . . . Although the light shielding plate 13, 13, . . . has been said to have been formed integral with the case 12, the same may be formed integral, oppositely, with the panel or as a separate member.

By thus providing the case 12 or the panel with the light shielding plate 13, 13, . . . made in a comblike shape, the need for troublesome positioning work can be eliminated and the light shielding plate 13, 13, . . . can be assembled with the phototransistors 11, 11, . . . such that each tooth is interposed between the phototransistors 11, 11, . . . in a single operation. That is, the work is finished just by lowering the comblike light shielding plate 13, 13, . . . on the array of the phototransistors 11, 11, . . . .

It may also be possible to dispose filters which transmit only infrared rays therethrough at the portions above the top of the phototransistors 11, 11, . . . (at the end faces of the light shielding plate 13, 13, . . . ) or these filters may be arranged so as to be extended from an escutcheon or cover.

Referring to FIGS. 4–6, a preferred form of light shielding structure is shown. The case 12 for the phototransistors 11 is formed as an integral unit mounted on a respective side of the touch panel 17. The case 12 is fitted over the array 10 mounting the row of phototransistors 11, and the infra-red filter 18 and cover 15 are attached. The case has integrally formed therewith side shielding plates 13 formed in a comblike manner to be interposed between each pair of adjacent phototransistors. Front shielding wall 14 also integrally provided in front of each phototransistor having a slit 14a in the central part thereof to limit the emitted light to a direction across the touch panel and prevent it from being directed outwardly from the panel toward the eyes of the viewer.

The shielding plates 13 and the front shielding walls extend toward the cover 15 so as to substantially enclose each phototransistor in a separate compartment of the case 12 to contain the emitted light and direct it only in the direction toward the opposite light receiving element. Similarly, photodiodes as the light receiving elements are mounted in a row on an array 10, and then enclosed and contained in the case 12 mounted thereon with the light shielding plates 13 and wall 14 forming separate compartments for each to receive light directed through the slits 14a from the opposite phototransistors.

According to the invention, as described in the foregoing, the assembling work of the light shielding arrangement for the photosensitive elements becomes much easier and the work efficiency can be improved largely.

What is claimed is:

1. In a photoelectric touch panel comprising a planar frame having two pairs of opposing photoelement arrays arranged along its sides, each pair having one array of equally spaced light emitting elements on one side of the frame facing toward corresponding photosensitive elements of the other array on the other side of the frame, and one pair of opposing arrays being oriented transverse to the other pair in the plane of the frame so as to form a planar matrix of light beams in front of a display screen, an improvement comprising each of said photoelement arrays being formed as a single mounting member having mounted thereupon said photoelements so that they are equally spaced apart in a line and oriented parallel to each other in the plane of the frame facing toward the corresponding opposite side of the frame, and a light shielding case, associated with each of said photoelement arrays, having integrally formed therewith a plurality of teeth in a comb-like configuration, said teeth extending parallel to each other in a direction perpendicular to the plane of the frame and each being formed as a wall spaced apart according to the spacing of said photoelements, said light shielding case being formed as an integral unit, said light shielding case being positioned with respect to said mounting member with its teeth inserted in said perpendicular direction between said photoelements to shield them from one another and external influences, wherein said light shielding case further has integrally formed therewith a front shielding wall having a plurality of slits forming respective light paths for corresponding photoelements between facing photoelement arrays.

* * * * *